Jan. 8, 1924.

D. O. SEWALL 1,480,017

PROCESS AND MACHINE FOR MAKING BANDAGES

Filed May 22, 1920      6 Sheets-Sheet 3

Inventor:
Dana O. Sewall
by J. H. McCrady
his Atty.

Jan. 8, 1924. 1,480,017
D. O. SEWALL
PROCESS AND MACHINE FOR MAKING BANDAGES
Filed May 22, 1920   6 Sheets-Sheet 4
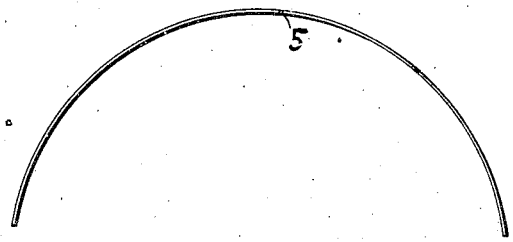
Fig. 4
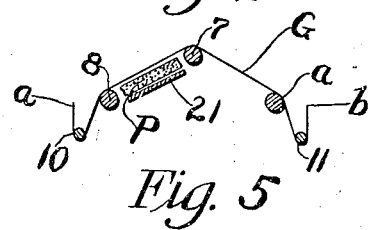
Fig. 5
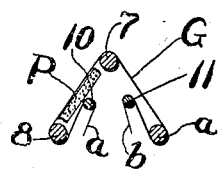
Fig. 6
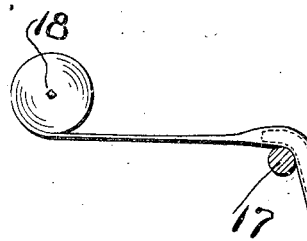
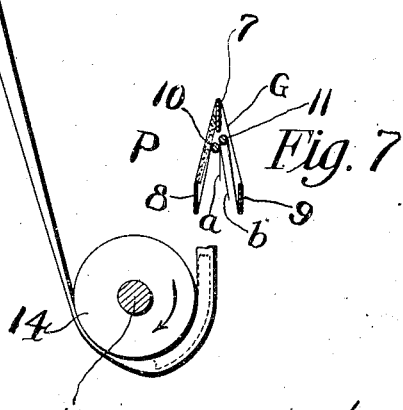
Fig. 7
Fig. 8
Inventor.
Dana O. Sewall
by J. H. McCurdy
his Atty.

Jan. 8, 1924.

D. O. SEWALL 1,480,017

PROCESS AND MACHINE FOR MAKING BANDAGES

Filed May 22, 1920 6 Sheets-Sheet 5

Inventor.
Dana O. Sewall
by J. H. McCurdy
his Atty.

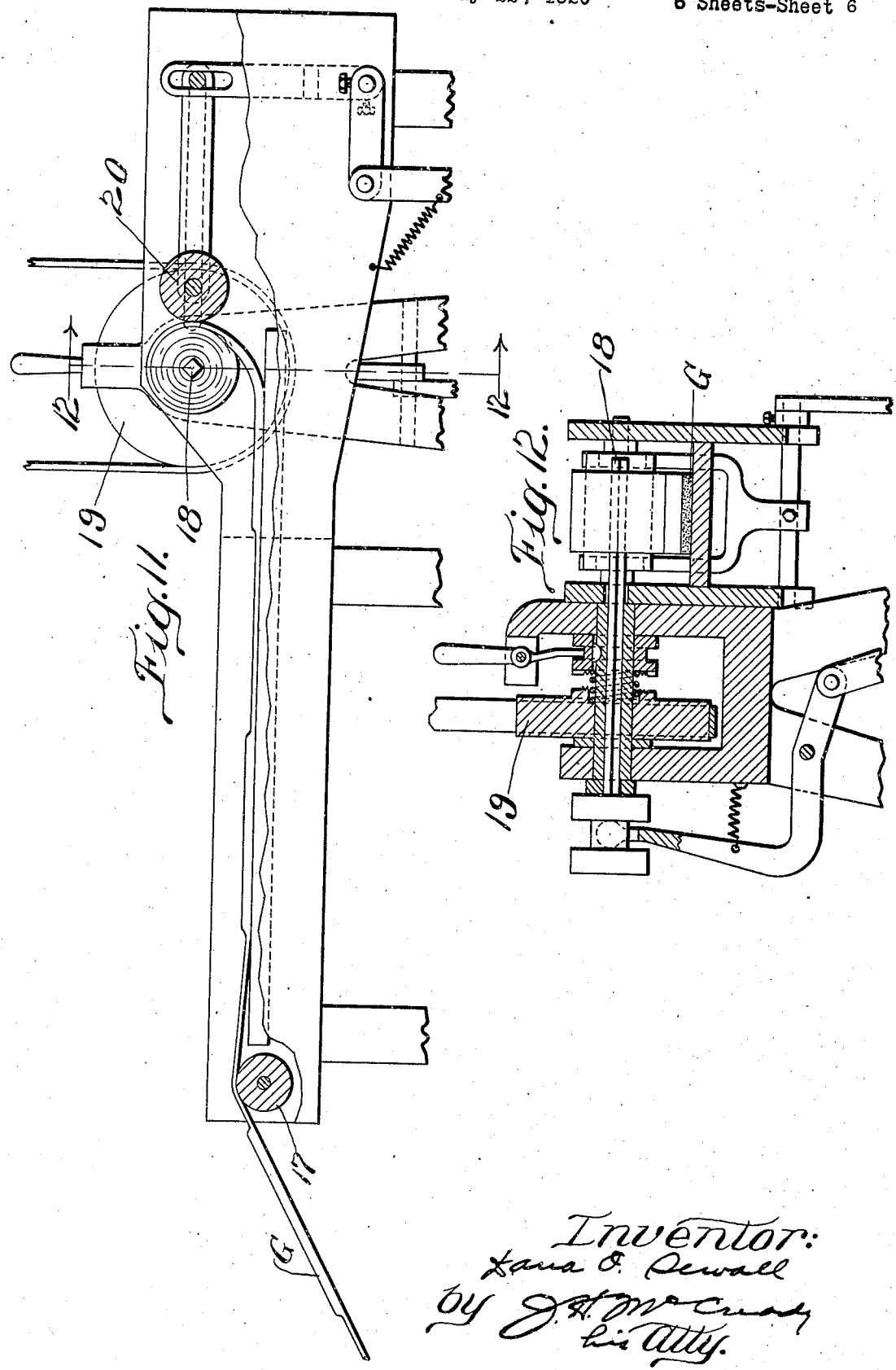

Patented Jan. 8, 1924.

1,480,017

UNITED STATES PATENT OFFICE.

DANA O. SEWALL, OF WALPOLE, MASSACHUSETTS, ASSIGNOR TO LEWIS MANUFACTURING COMPANY, OF WALPOLE, MASSACHUSETTS, A CORPORATION OF MASSACHUSETTS.

PROCESS AND MACHINE FOR MAKING BANDAGES.

Application filed May 22, 1920. Serial No. 383,529.

*To all whom it may concern:*

Be it known that I, DANA O. SEWALL, a citizen of the United States, residing at Walpole, in the county of Norfolk and State of Massachusetts, have invented certain Improvements in Processes and Machines for Making Bandages, of which the following description, in connection with the accompanying drawings, is a specification, like reference characters on the drawings indicating like parts in the several figures.

This invention relates to the manufacture of bandages, sanitary napkins and the like, and is especially concerned with a bandage of the type disclosed in my earlier application Serial No. 208,388 filed July 3, 1919.

It will readily be appreciated that the price limits within which an article of this character must be sold are very narrow, and that consequently economy in manufacture is an essential requirement to the maintenance of a successful business in this line. With this condition in mind it is an important object of this invention to devise a process of manufacture of articles of the character mentioned and a machine for manufacturing such articles which will materially reduce the labor expense required in such manufacture while still producing an entirely satisfactory article.

The nature of the invention will be readily understood from the following description when read in connection with the accompanying drawings, and the novel features will be particularly pointed out in the appended claims.

Referring now to the drawings,

Fig. 4 is a plan view of one of the folding devices;

Figure 1:
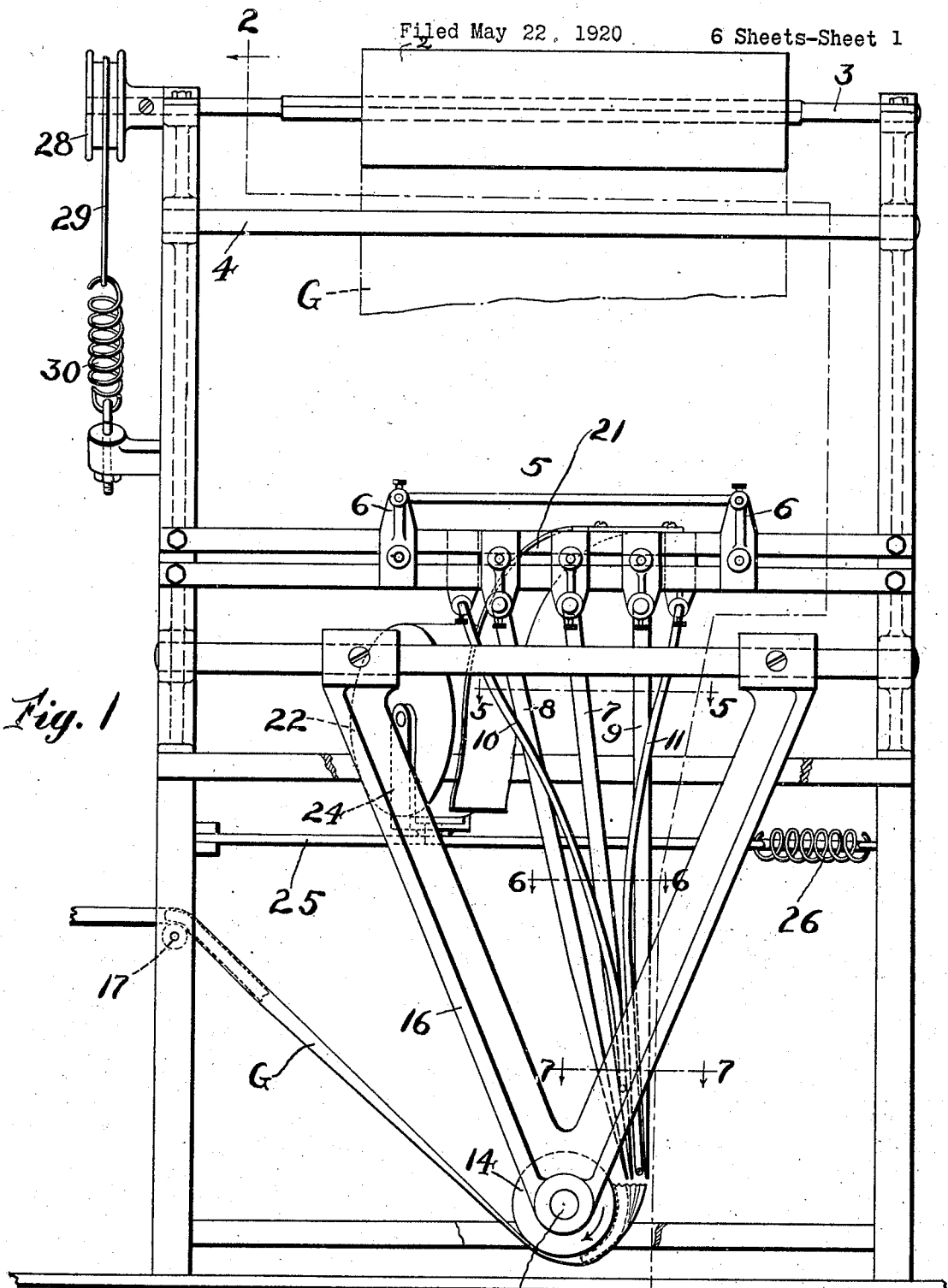
Figure 1 is a front elevation of a machine constructed in accordance with the present invention.
Figure 9:
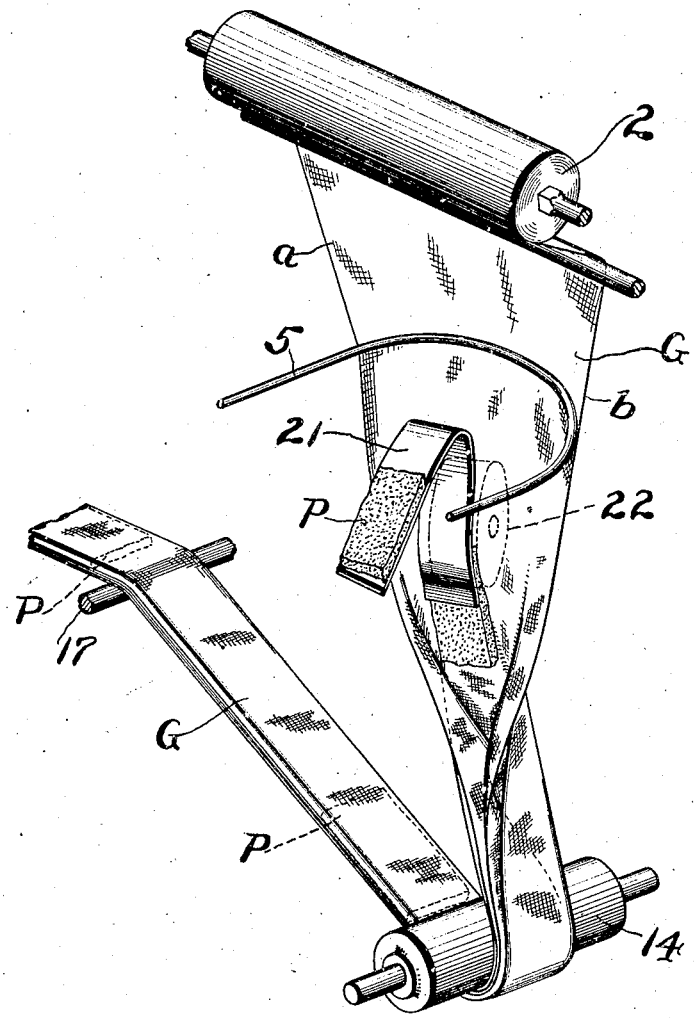
Figure 10:
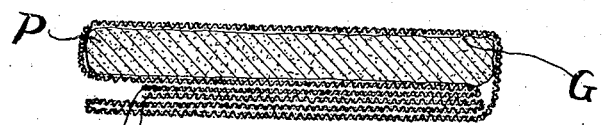

Figs. 5, 6 and 7 are cross sectional views on the lines 5—5, 6—6, and 7—7, respectively, Fig. 1, illustrating successive steps in the folding operation;

Fig. 8 is a diagrammatic view illustrating additional steps in the process of manufacture;

Fig. 9 is a perspective view illustrating the steps in the process of manufacture;

Fig. 10 is a cross sectional view through one of the bandages showing the construction thereof;

Fig. 11 is a side elevation showing part of the mechanism for winding the bandage strip; and Fig. 12 is a cross sectional view substantially on the line 12—12, Fig. 11.

As above stated, this invention is especially concerned with the manufacture of the type of bandages disclosed in my prior application. This bandage consists of a strip of gauze folded to form a series of superposed layers and it includes a series of pads, preferably of absorbent cotton, which are spaced at intervals along this strip and are enclosed within the folds of the strip.

Referring to Fig. 10, which shows a cross sectional view of one of these bandages, the cross section being taken through the pad, P designates the cotton pad and G designates the gauze or other fabric used to form the main body of the bandage strip. While any one of a variety of sheet materials may be used for the strip, this material will be herein referred to as gauze since this is the material most commonly used for this purpose, and the inserts or pads will be referred to as made of cotton, since this also is the material of which these pads or inserts are most commonly made. It will be understood, however, that the invention is not limited to these particular materials.

According to the present process this bandage is made in the form of a continuous strip having pads spaced apart therealong and the strip is rolled up after it is completed and is cut into intersections each containing a definite number of pads. In using the bandages the strip is cut up by the user, the cutter being performed substantially midway between adjacent pads, and each section so cut up with the pad therein constitutes a bandage or napkin.

The general nature of the process will be understood by referring to Fig. 9 from which it will be seen that the strip of gauze G is unwound from a supply roll 2 and is led through folding devices that fold it into a series of superposed layers as shown in Fig. 10, the cotton inserts P being placed in contact with the strip at a point where the initial folds are being made so that it is enclosed in the strip between the folds.

Figure 2:
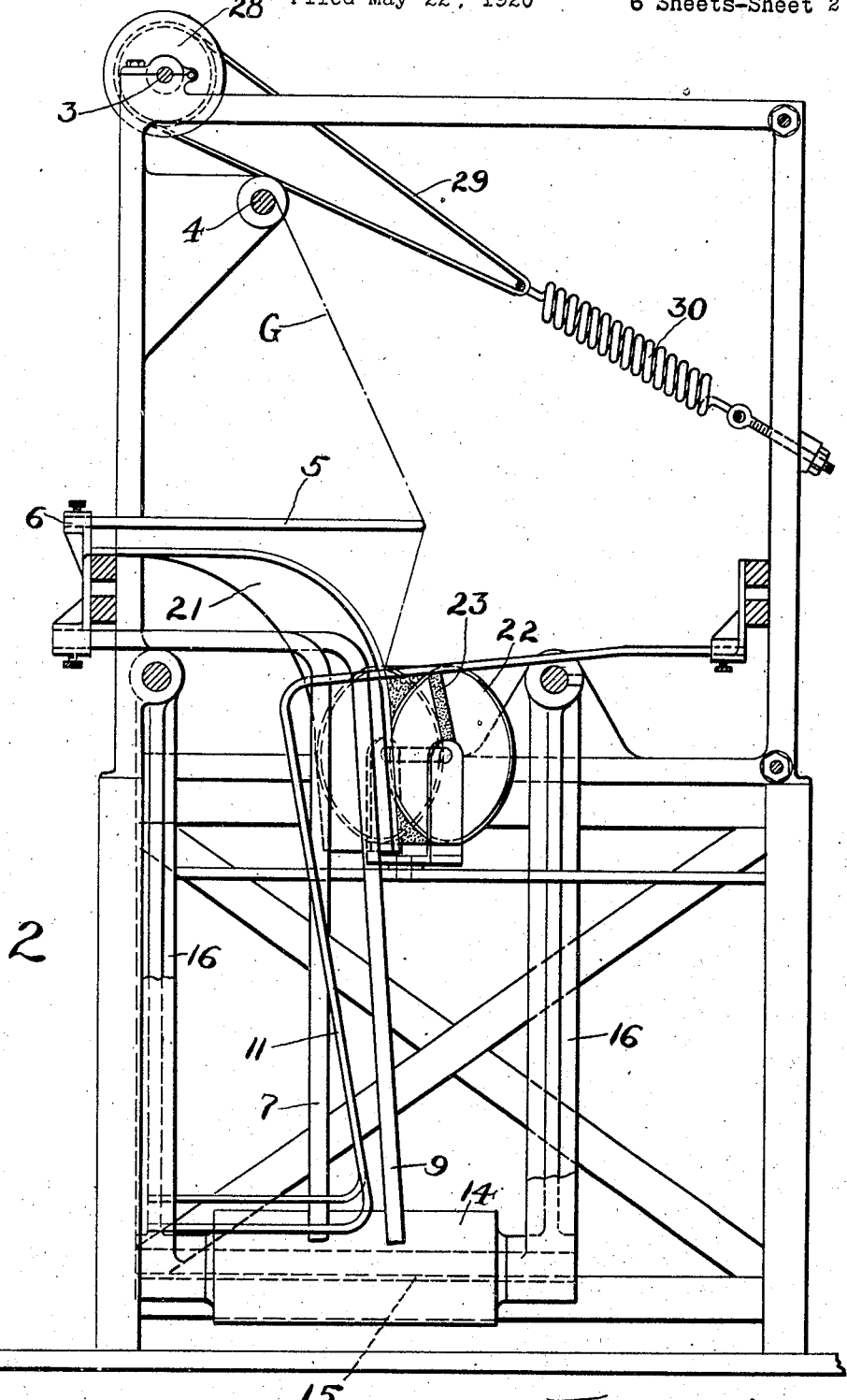
Fig. 2 is a cross sectional view on the line 2—2, Fig. 1.
Figure 3:
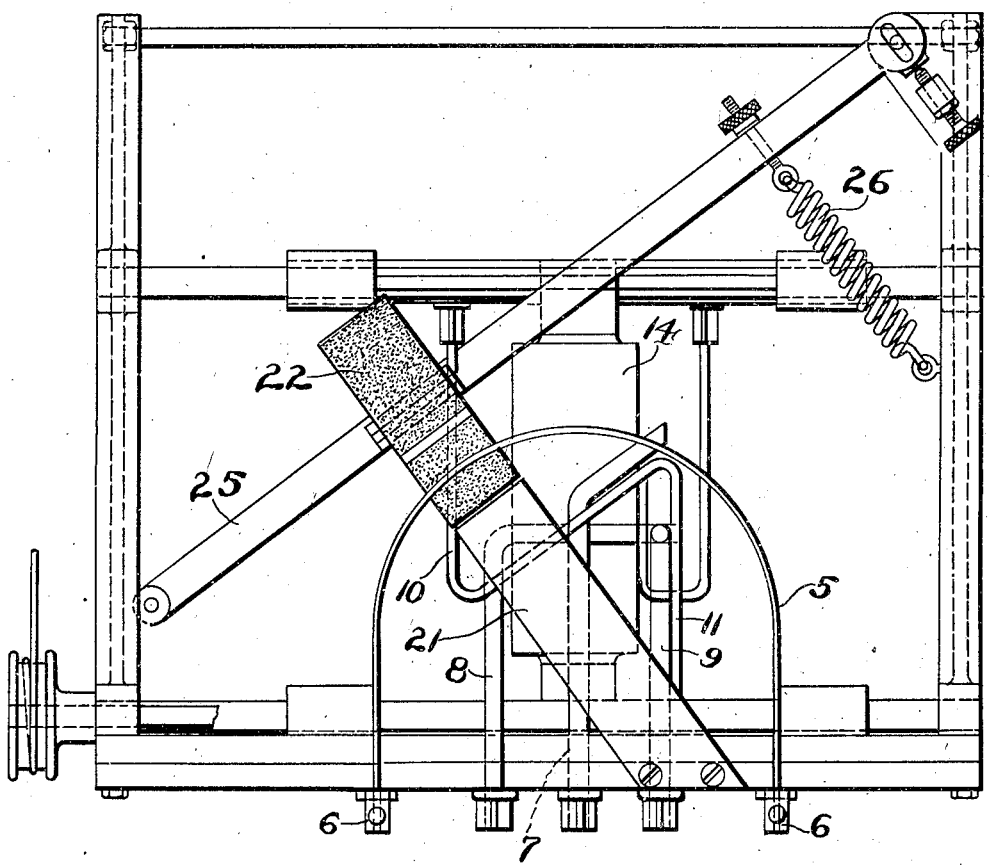
Fig. 3 is a plan view of the machine shown in Figs. 1 and 2.

Referring now to Figs. 1, 2 and 3, the machine there shown comprises a suitable frame having bearings to support a shaft 3 on which the roll 2 of gauze is mounted. The strip of gauze G is led over a roll or round rod 4 to the first of the folding devices 5. This device consists of a bow, as best shown in Figs. 3 and 4, having its ends secured in brackets 6—6 that are rigidly supported in the machine frame. The contact of the gauze with the outer or convex side of this bow serves to bend the gauze transversely about the bow. From this bow the strip of gauze passes into engagement with a series of folding fingers. These fingers comprise a central member 7, two additional fingers 8 and 9 at opposite sides of the finger 7, and outer fingers 10 and 11 respectively. The operations performed by these fingers will best be understood by referring to Figs. 1, and 4 to 7 inclusive. It will be seen that the fingers 7, 8 and 9 extend downwardly in converging directions and that they terminate at their lower ends in thin blade-like extensions as shown in Fig. 7, the lower ends of the fingers 8 and 9 being much closer to each other than are the upper portions of said fingers. The outer fingers 10 and 11 sweep around the fingers 8 and 9 in the form of a slow spiral (speaking roughly.) The result, therefore, of drawing a web of gauze through these fingers is to fold it into the form shown in Fig. 10. It may here be pointed out that the raw edges $a$ and $b$ of the gauze are, due to this arrangement, turned within the folded strip so that they are entirely concealed in the finished strip.

The folded strip of gauze after leaving the lower ends of the folding fingers passes immediately over a roll 14 mounted to rotate idly on a shaft 15 which is supported in brackets 16—16, and the strip then moves over a guide roll 17 to the spindle 18 of a winding or rolling device. This spindle is rotated by a pulley 19 so that it winds up the strip. The pull of the spindle on the folded strip of gauze feeds the strip through the folding devices and enables them to perform their folding operation.

The pads P may be fed by hand or in any suitable manner into contact with the strip G of gauze and are brought into contact with the strip adjacent to the point at which the initial folds are being made. In order to facilitate this feeding operation when it is performed by hand, a curved plate 21 extends from the front of the machine toward the gauze and projects downwardly substantially parallel to the path of travel of the gauze. The attendant slides the pads P one at a time along this strip and in order to guide the operator in feeding these pads in the proper relationship to the travel of the gauze, a wheel 22 is mounted at the opposite side of the strip from the plate 21. The operative can see a mark 23, Fig. 2, formed on one face of this wheel and the wheel is covered with sand-paper, rubber or some other material that will exert considerable friction on the strip of gauze. Consequently, as the strip moves downwardly in contact with the wheel it rotates the wheel and the attendant, by watching the mark 23, can advance the pad so that its forward edge will strike the gauze just as the mark 23 comes in contact with the gauze. This arrangement ensures the proper spacing of the pads. Each pad is caught by the gauze and carried downwardly past the plate 21, where it is caught in the folds and carried along with the gauze. The roll 22 is supported in a U-shaped bracket 24 that is swivelled on a pivoted cross bar 25 and a spring 26, Fig. 2, acting on this cross bar holds it yieldingly in engagement with the gauze.

As the folded strips containing the pads are rolled up on the spindle 18, an operator standing beside the spindle counts the pads and stops the rotation thereof when a predetermined number have been wound in this manner. The strip is then severed and the bandage roll so formed is removed.

In order to prevent the formation of slack in the strip G due to the momentum of the roll 2 when the machine is stopped, the shaft 3 is provided with a brake. That is, a brake pulley 28 is mounted fast on this shaft and a loose band 29 is looped over it, a spring 30 acting on this band to hold the loop yieldingly in contact with the surface of the pulley and thus to exert a constant friction on it.

The operation of rolling up or winding the complete bandage strip may be performed in one of the winding mechanisms used for analogous purposes and preferably the winding is performed while a pressure roll 20 bears against the bandage roll so that the bandage is compressed at the winding point. Consequently a very firm, solid roll is produced. After the rolling has been finished and the strip has been cut, the spindle 18 is withdrawn from the roll and the winding operation then is repeated to produce another roll.

It will now be seen that this invention provides a simple but thoroughly practical process of making a bandage strip of the general character disclosed in my earlier application, and that it also provides a novel form of machine with which such bandages can be manufactured very rapidly and economically.

A particular advantage of this process is the peculiar fold that is made in the gauze which results in completely enclosing the cotton pad within the folded strip, no portion of the pad being exposed. This pad is held securely against displacement by the interlocking of its fibres with the coarse mesh of the gauze. A further advantage of the peculiar fold here disclosed is that the selvage or raw edges $a$ and $b$ are also enclosed within the folds of the strip and are not exposed where they might chafe or irritate the user. It will be seen particularly from an inspection of Figs. 5, 6 and 7 that this advantage is produced by folding the outer margins of the strip G inwardly toward each other and toward the central portion of the strip and then turning the inner marginal portions outwardly away from the center of the strip. This also has the advantage of firmly holding the pad in a position closer to one side of the strip than the other. That is, one face of the pad is covered by only a single layer of gauze while the opposite face is covered by several layers and this fact is of particular advantage when the article is to be used as a sanitary napkin.

What is claimed as new is:

1. That improvement in the process of making bandages which consists in feeding a continuous strip of gauze or the like, utilizing the feeding movement of the strip to fold it, and inserting absorbent pads in the strip at intervals during the feeding and folding thereof whereby said pads are held between the folds at spaced intervals.

2. That improvement in the process of making bandages which consists in feeding a continuous strip of gauze or the like, folding said strip while it is so fed to form a series of superposed layers, and introducing inserts at spaced intervals in the folded strip during the folding and feeding movements thereof whereby said inserts are enclosed in the strip and held between the folds.

3. That improvement in the process of making bandages which consists in feeding a continuous strip of gauze or the like, utilizing the feeding movement of the strip to fold it, introducing inserts at spaced intervals in the folded strip during the folding and feeding movements thereof whereby said inserts are enclosed in the strip and held between the folds, cutting off sections of the folded strip at intervals and rolling up the sections so cut off.

4. That improvement in the process of making bandages which consists in feeding a continuous strip of gauze or the like, utilizing the feeding movement of the strip to fold it, introducing absorbent inserts at spaced intervals in the folded strip during the folding and feeding movements thereof whereby said inserts are enclosed in the strip and held between the folds, rolling up the folded strip with the inserts therein, stopping said feeding movement, and cutting the strip while it is so stopped.

5. That improvement in the process of making bandages which consists in feeding a continuous strip of gauze or the like, folding said strip while it is so fed to form a series of superposed layers with the raw edges of the strip enclosed within the folds, and introducing absorbent pads at spaced intervals prior to the completion of the folding operation whereby said pads are enclosed between the folds of the strip.

6. That improvemnt in the process of making bandages which consists in feeding a continuous strip of gauze or the like, folding said strip while it is so fed to form a series of superposed layers, and introducing absorbent pads between said layers in such a position that a series of said layers cover one side of the pad and a lesser number of layers cover the other side of the pad.

7. That improvement in the process of making bandages which consists in feeding a continuous strip of gauze or the like, utilizing stationary members to engage said strip and fold it during the feeding movement thereof, and inserting cotton pads at spaced intervals in the strip during the folding and feeding thereof whereby said pads are enclosed between the folds of the folded strip.

8. That improvement in the process of making bandages which consists in feeding a continuous strip of gauze or the like, utilizing the feeding movement of the strip to fold it, introducing absorbent pads at spaced intervals in the folded strip during the folding and feeding movements thereof whereby said pads are enclosed in the strip and held between the folds, rolling up the folded strip with the pads therein, compressing the strip while it is being rolled up to form a tight roll and cutting the strip to sever the rolled section.

9. In a machine for making bandages, the combination of stationary folding devices and means for feeding a strip of gauze past said devices in contact therewith, said devices being operative during said feeding movement to fold the strip into a series of superposed layers, and a curved plate having a portion thereof positioned close to the gauze at the point where the initial folds are formed to facilitate the guiding of an insert into position between the folds of said strip of gauze.

10. In a machine for making bandages, the combination of folding means for acting on a continuous strip of gauze to fold it upon itself and making a series of superposed layers, means for rolling the folded strip of gauze, said rolling means acting also to feed the strip for the action thereon of said folding means, and guiding means for facilitating the introduction of inserts at substantially uniform spaced intervals between said layers while said folds are being formed.

11. In a machine for making bandages, the combination of stationary folding devices, means for feeding a strip of gauze past said devices in contact therewith, said devices being operative during said feeding movement to fold the strip into a series of superposed layers, a curved plate having a portion thereof positioned close to the gauze at the point where the initial folds are formed to facilitate the guiding of an insert into position between the folds of said strip of gauze, and a guide wheel running in contact with the gauze and positioned closely adjacent to said plate.

12. In a machine for making bandages, the combination of a support for a roll of gauze or the like, stationary folding devices comprising a bow to engage the strip of gauze unwound from said roll and a series of depending folding fingers positioned to engage the strip after it leaves the bow and operative to fold said strip into a plurality of superposed layers, means for feeding said strip past said folding devices, guiding means for facilitating the introduction of absorbent pads at substantially uniformly spaced intervals between said layers while said folds are being formed and a roll over which the folded strip is guided immediately after leaving said folding devices.

In testimony whereof I have signed my name to this specification.

DANA O. SEWALL.